United States Patent
Duan et al.

(10) Patent No.: US 8,547,700 B2
(45) Date of Patent: Oct. 1, 2013

(54) SLIDING MODULE FOR ELECTRONIC DEVICE

(75) Inventors: Chao Duan, Shenzhen (CN); Chia-Hua Chen, Shindian (TW)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 192 days.

(21) Appl. No.: 13/164,309

(22) Filed: Jun. 20, 2011

(65) Prior Publication Data

US 2012/0162927 A1  Jun. 28, 2012

(30) Foreign Application Priority Data

Dec. 22, 2010  (CN) .......................... 2010 1 0600409

(51) Int. Cl.
*H05K 7/16* (2006.01)
(52) U.S. Cl.
USPC ................... 361/727; 361/679.16; 361/679.2; 361/679.04; 361/679.06; 361/679.07
(58) Field of Classification Search
USPC .............. 361/679.27, 727; 455/575.3, 575.4; 70/158
See application file for complete search history.

(56) References Cited

U.S. PATENT DOCUMENTS

| | | | |
|---|---|---|---|
| 7,278,184 B2* | 10/2007 | Kuramochi | 16/357 |
| 8,073,502 B2* | 12/2011 | Malthe et al. | 455/575.1 |
| 2002/0077161 A1* | 6/2002 | Eromaki | 455/575 |
| 2008/0304215 A1* | 12/2008 | Chiu | 361/681 |
| 2009/0149229 A1* | 6/2009 | Li et al. | 455/575.4 |
| 2010/0022286 A1* | 1/2010 | Wang et al. | 455/575.4 |
| 2010/0197356 A1* | 8/2010 | Song et al. | 455/566 |

\* cited by examiner

*Primary Examiner* — Hoa C Nguyen
*Assistant Examiner* — Ahmad D Barnes
(74) *Attorney, Agent, or Firm* — Altis & Wispro Law Group, Inc.

(57) ABSTRACT

A sliding module includes a first section, a second section, a sliding member, at least one elastic member and a pivot body. The sliding member is slidably engaged with the first section, and is rotatably connected to the second section. One end of the at least one elastic member is fixed to the first section, the other end is fixed to the sliding member. Two ends of the pivot body are respectively connected to the first section and the second section. When the sliding member slides relative to the first section, the pivot body brings the second section to move and rotate relative to the first section in a tilted orientation.

12 Claims, 5 Drawing Sheets

SLIDING MODULE FOR ELECTRONIC DEVICE

CROSS-REFERENCE TO RELATED APPLICATIONS

The present application is related to co-pending U.S. patent applications (application Ser. No. 13/164,301), each entitled "SLIDING MODULE FOR ELECTRONIC DEVICE": by Duan et al. These applications have the same assignee as the present application and have been concurrently filed herewith. The above-identified applications are incorporated herein by reference.

BACKGROUND

1. Technical Field

The present disclosure generally relates to electronic devices, and particularly to a sliding module for an electronic device.

2. Description of Related Art

Portable electronic devices such as mobile phones, laptops, and personal digital assistants (PDAs) are widely used. As such, the sales and use of slide-type portable electronic devices have been on the increase. A slide-type portable electronic device has two housings, of which one slides relative to the other by a slide mechanism to open/close the portable electronic device.

However, the slide-type portable electronic devices typically only allows the two housings to slide parallel to each other. Therefore, when the slide-type portable electronic device is placed horizontally, it can be difficult for users to view a display screen on the housing.

Therefore, there is room for improvement within the art.

BRIEF DESCRIPTION OF THE DRAWINGS

Many aspects of the tilt mechanism for electronic device can be better understood with reference to the following drawings. The components in the drawings are not necessarily to scale, the emphasis instead being placed upon clearly illustrating the sliding module for electronic device. Moreover, in the drawings, like reference numerals designate corresponding parts throughout the several views.

DETAILED DESCRIPTION

Figure 1:
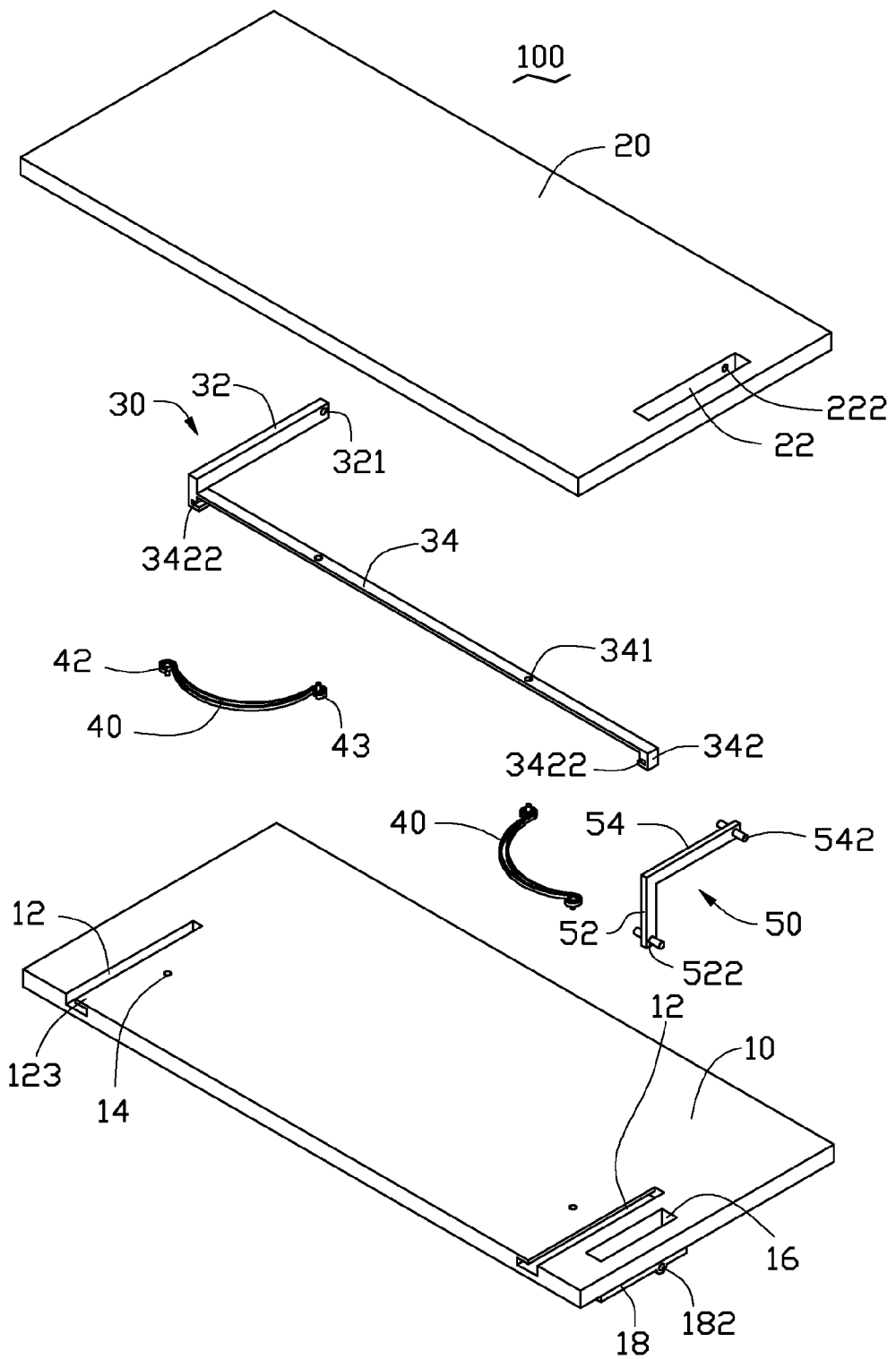
FIG. 1 is an exploded, isometric view of an electronic device according to an exemplary embodiment.
Figure 2:
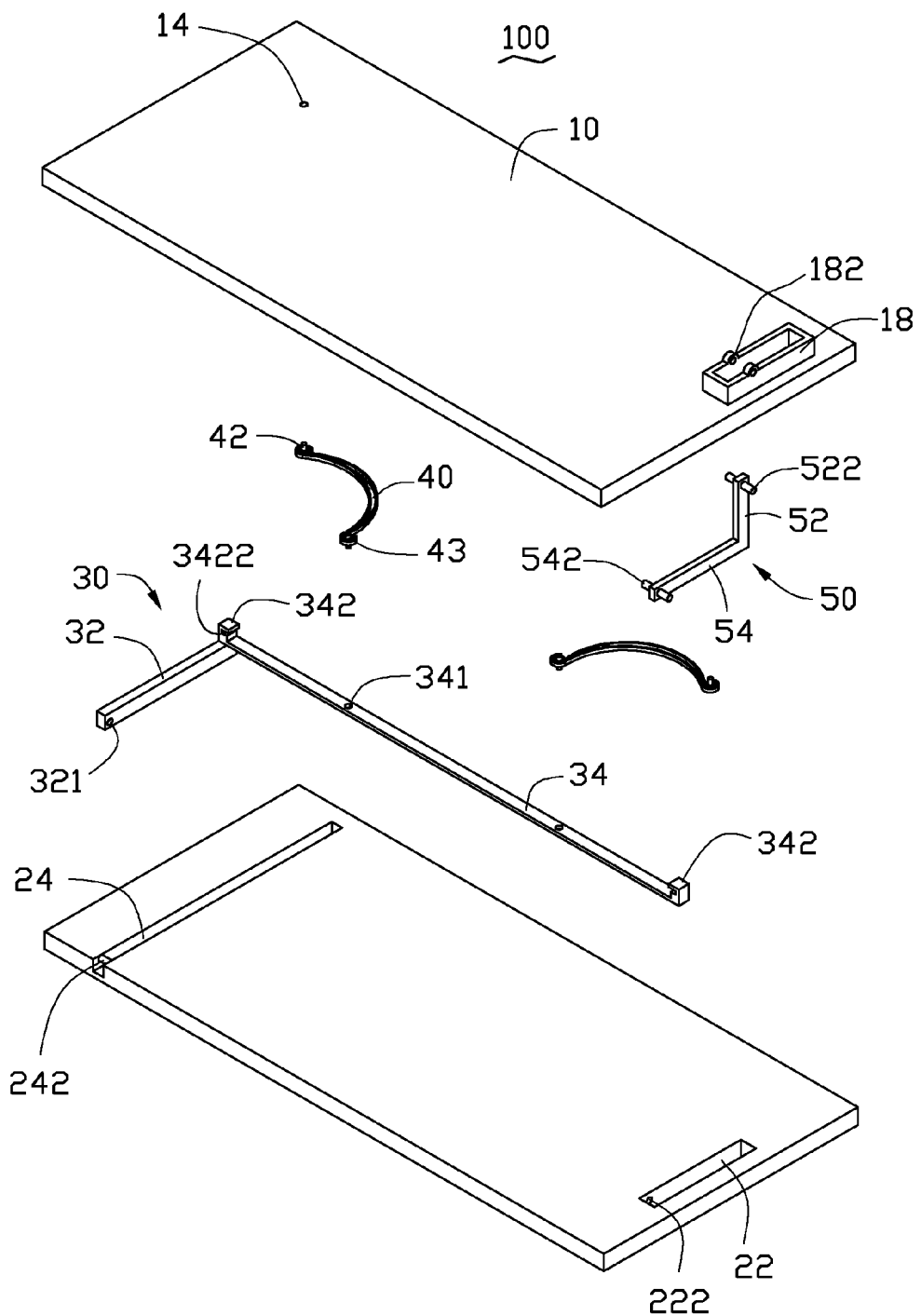
FIG. 2 is similar to FIG. 1, but shown from another angle.

FIG. 1 and FIG. 2 show an exemplary embodiment of a sliding module 100 applied in an electronic device, such as a mobile phone, or a personal digital assistant. The sliding module 100 can be in a closed orientation and a tilted open orientation. The sliding module 100 includes a first section 10, a second section 20, a sliding member 30, two elastic members 40, and a pivot body 50. In the closed orientation, the first section 10 and the second section 20 overlap each other. In the tilted open orientation, the second section 20 tiltes relative to the first section 10 for better viewing.

The first section 10 defines two elongated guiding slots 12 at opposite sides of one surface thereof. A rail 123 extends into each guiding slot 12. Two fixed holes 14 are defined at opposite sides of the first section 10. A through receiving hole 16 is defined in the first section 10 adjacent to one guiding slot 12. A block 18 is formed on an opposite surface of the first section 10 and surrounds the through receiving hole 16. The block 18 is substantially a rectangular frame, and has two opposite pivot portions 182 formed thereon.

Referring to FIG. 2, the second section 20 defines a connecting hole 22 and a receiving slot 24 at opposite sides of one surface. Opposite inner walls in the connecting hole 22 respectively define a pivot hole 222. The pivot holes 222 are positioned at one end of the connecting hole 22. A post 242 is formed at one end of the receiving slot 24.

The sliding member 30 includes an arm 32 and a beam 34 integrally formed together. The beam 34 is substantially perpendicular to the arm 32. One end of the arm 32 defines a post hole 321 for rotatably receiving the post 242 to connect one end of the sliding member 30 to the first section 10. A length of the beam 34 is substantially equal to a distance between the two guiding slots 12. Each of two distal ends of the beam 34 defines a guiding portion 342 for being slidably received in the guiding slot 12 of the first section 10. In this exemplary embodiment, each guiding portion 342 defines a groove 3422 for slidably receiving a corresponding rail 123. The beam 34 defines two locking holes 341.

The elastic member 40 may be a wire spring, a pressure spring, a torsion spring, or a spring plate. Each elastic member 40 includes a first ring-shaped connecting end 42 and a second ring-shaped connecting end 43. The first connecting end 42 is connected to one of the fixed holes 14 of the first section 10, and the second connecting end 43 is connected to one of the receiving holes 341. Thus, the elastic members 40 connect the first section 10 and the sliding member 30, and the elastic members 40 can limit a sliding distance of the first section 10 relative to the sliding member 30.

The pivot body 50 includes a first pivot arm 52 and a second pivot arm 54 perpendicularly connected to the first pivot arm 52. The first pivot arm 52 is connected to the first section 10, and the second pivot arm 54 is connected to the second section 20. The first pivot arm 52 has a pivot pin 522 formed on one end thereof. The pivot pin 522 is received in the pivot portions 182. The second pivot arm 52 has a pivot pin 542 formed at one end. The pivot pin 542 is rotatably received in the pivot holes 222 in the connecting hole 22.

In assembly, the first connecting ends 42 of the elastic members 40 are connected to the fixed holes 14 of the first section 10. The guiding portions 342 of the sliding member 30 are slidably engaged in the guiding slots 12, the rails 123 are received in the grooves 3422. The arm 32 is aligned with one guiding slot 12, and the beam 34 is placed on the surface of the first section 10. The second connecting, ends 43 of the elastic members 40 are connected to the locking holes 341 of the beam 34. Then, the pivot body 50 extends through the receiving hole 16. The pivot pin 522 of the first pivot arm 52 is received in the pivotal portions 182. The second pivot arm 54 is received in the connecting hole 21. The pivot pin 542 is rotatably received in the pivot holes 222. The arm 32 is received in the receiving slot 24. The post 242 extends through the post hole 321 to connect the sliding member 30 to the second section 20. Accordingly, the sliding module 100 is assembled.

Figure 3:
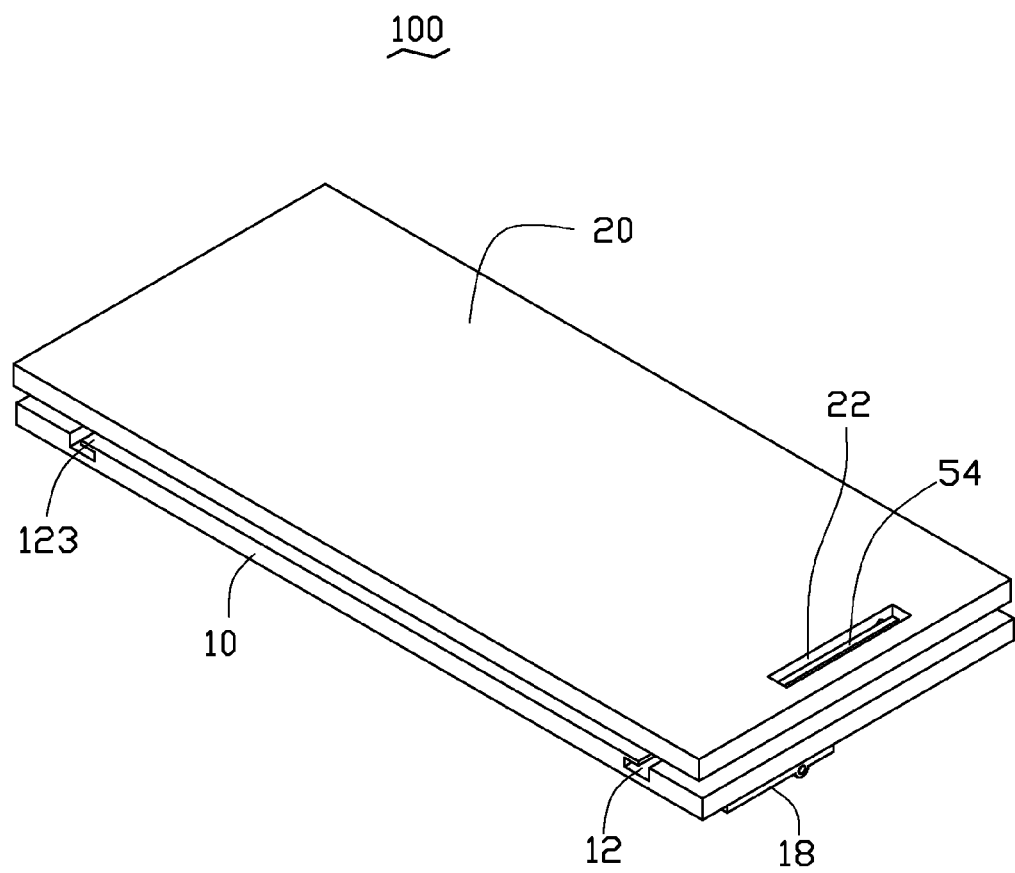
FIG. 3 is an isometric view of the electronic device of FIG. 1 in a closed orientation.
Figure 4:
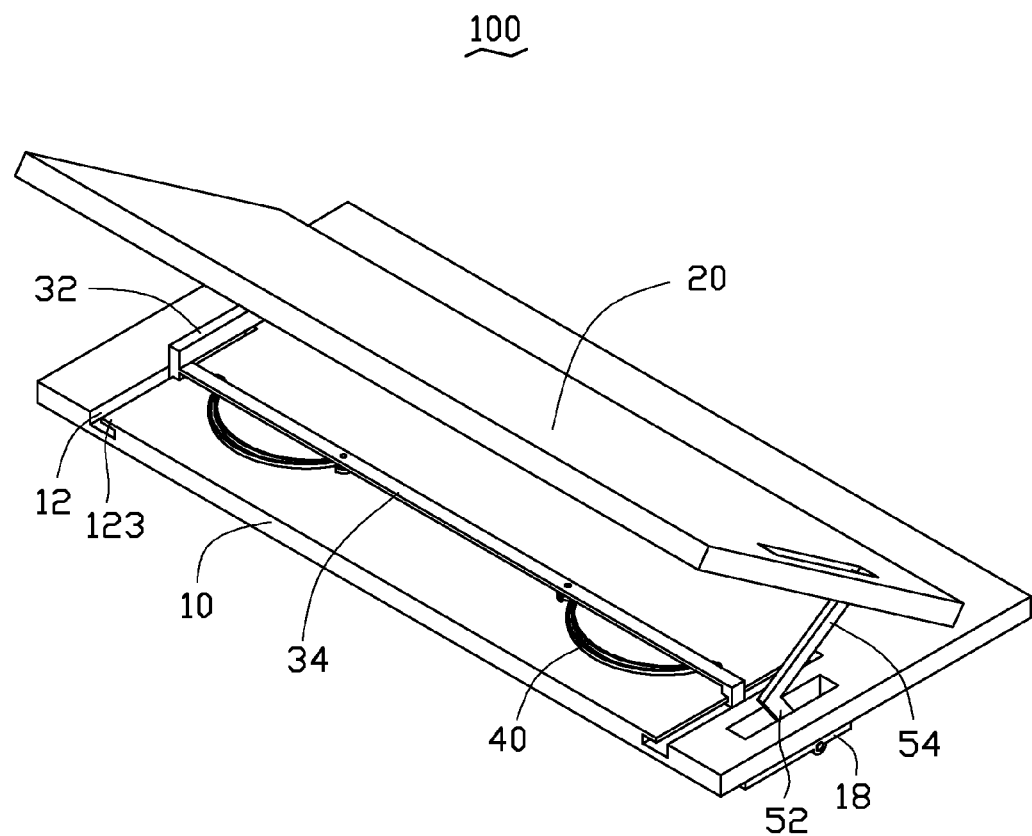
FIG. 4 is an isometric view of the electronic device of FIG. 3 during a sliding process.
Figure 5:
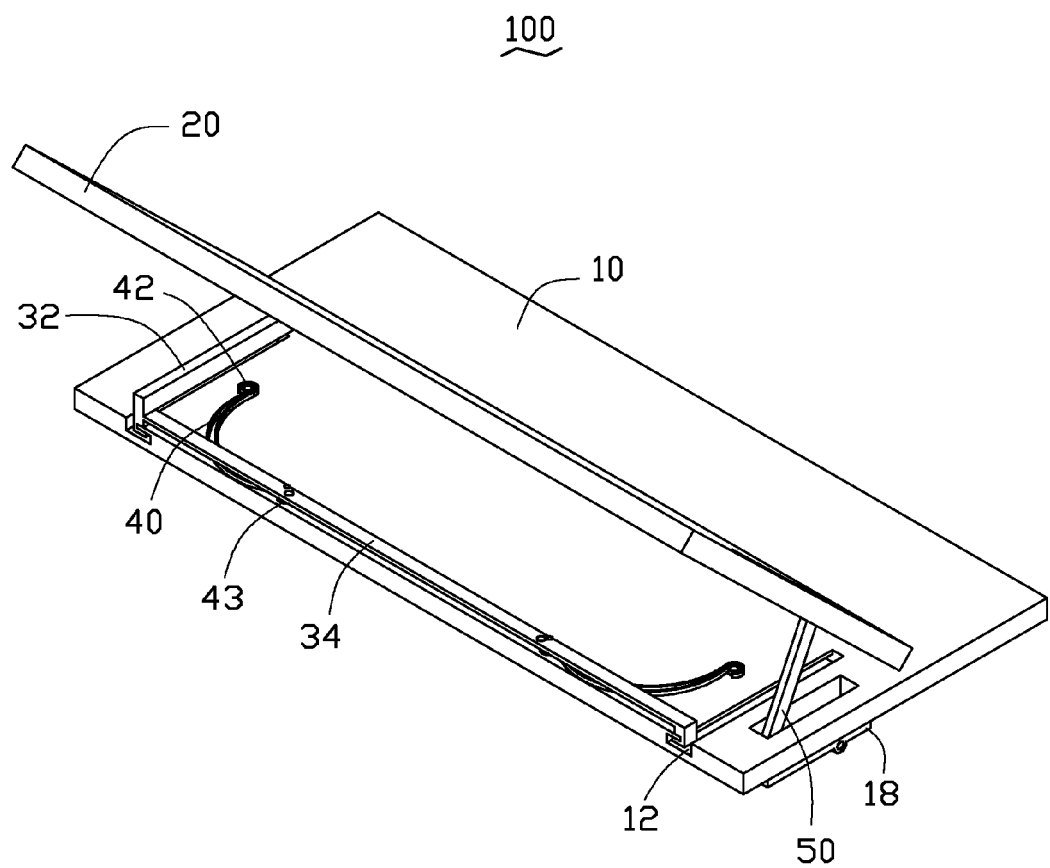
FIG. 5 is an isometric view of the electronic device of FIG. 3 in an open orientation.

Referring to FIG. 3, when the sliding module 100 is in a closed orientation, the second section 20 is on the first section 10. The pivot body 50 is received in the receiving hole 16 and the connecting hole 22. Referring to FIGS. 4 and 5, when the sliding module 100 is opened, a force is applied to the second section 20 to move the second section 20 away from the first section 10. The sliding member 30 slides along the guiding slot 12 of the first section 10 to force the pivot body 50 to rotate. Thus, the elastic members 40 accumulate elastic energy until the sliding member 30 slides to a critical position relative to the first section 10. At this position, the elastic members 40 are compressed to a maximized deformation. After that, the second section 20 can further automatically slide towards the closed position by returning the elastic members 40 from their compressed states to their original states. The second section 20 is supported in a tilted position relative to the first section 10.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A sliding module comprising:
   a first section defining a receiving hole and forming a block, the block surrounding the receiving hole;
   a second section defining a connecting hole;
   a sliding member slidably engaged with the first section, and rotatably connected to the second section;
   at least one elastic member; one end of the at least one elastic, member fixed to the first section, the other end thereof fixed to the sliding member; and
   a pivot body, the pivot body including a first pivot arm and a second pivot arm perpendicularly connected to the first pivot arm, the first pivot arm extending through the receiving hole and rotatably connected to the block, the second pivot arm received in the connecting hole, and rotatably connected to the second section;
   wherein when the sliding member slides relative to the first section, the pivot body brings the second section to move and rotate relative to the first section in a tilted orientation.

2. The sliding module as claimed in claim 1, wherein the first section defines a guiding slot, and the sliding member includes a guiding portion for slidably received in the guiding slot.

3. The sliding module as claimed in claim 1, wherein the block is substantially a rectangular frame, and has two opposite pivot portions formed thereon, the second pivot arm is rotatably connected to the pivot portions.

4. The sliding module as claimed in claim 2, wherein the sliding member includes an arm and a beam perpendicularly connected to the arm, the arm is connected to the second section, and the guiding portion is formed on one end of the beam.

5. The sliding module as claimed in claim 4, wherein one end of the arm defines a post hole, the second section defines a receiving groove, and a post extends through the post hole to connect the arm to the receiving groove.

6. An electronic device comprising:
   a first section defining a receiving hole and block, the block surrounding the receiving hole;
   a second section defining a connecting hole;
   a sliding member slidably engaged with the first section, and rotatably connected to the second section;
   at least one elastic member connecting the first section to the sliding member for driving the sliding member to slide relative to the first section; and
   a pivot body including a first pivot arm and a second pivot arm perpendicularly connected to the first pivot arm, the first pivot arm extending through the receiving hole and rotatably connected to the block, the second pivot arm received in the connecting hole, and rotatable connected to the second section, the pivot body supporting the second section in a tilted orientation relative to the first section.

7. The electronic device as claimed in claim 6, wherein the first section defines a guiding slot, and the sliding member includes a guiding portion for slidably received in the guiding slot.

8. The electronic device as claimed in claim 6, wherein the block is substantially a rectangular frame, and has two opposite pivot portions formed thereon, the second pivot arm is rotatably connected to the pivot portions.

9. The electronic device as claimed in claim 7, wherein the sliding member includes an arm and a beam perpendicularly connected to the arm, the arm is connected to the second section, and the guiding portion is formed on one end of the beam.

10. The electronic device as claimed in claim 9, wherein one end of the arm defines a post hole, the second section defines a receiving groove, and a post extends through the post hole to connect the arm to the receiving groove.

11. A sliding module comprising:
    a first section defining two elongated guiding slots, a receiving hole and forming a block, the block surrounding the receiving hole;
    a second section defining a connecting hole and a receiving slot at opposite sides;
    a sliding member including a first beam and a second beam perpendicular to the first beam, the first beam slidably engaged with the two elongated guiding slots of the first section, the second beam rotatably engaged in the receiving slot, of the second section;
    at least one elastic member, one end of the at least one elastic member fixed to the first section, the other end thereof fixed to the sliding member; and
    a pivot body, the pivot body including a first pivot arm and a second pivot arm perpendicularly connected to the first pivot arm, the first pivot arm extending through the receiving hole and rotatably connected to the block, the second pivot arm rotatably received in the connecting hole of the second section;
    wherein when the sliding member slides relative to the first section, the pivot body brings the second section to move and rotate relative to the first section in a tilted orientation.

12. The sliding module as claimed in claim 11, wherein opposite distal ends of the first beam includes a guiding portion for slidably received in the elongated guiding slots, one end of the second beam defines a post hole, and a post extends through the post hole to connect the second beam to the receiving groove.

* * * * *